Aug. 2, 1966   C. H. CLEMENT   3,263,880
PURSE RETAINER
Filed March 15, 1965   2 Sheets-Sheet 2
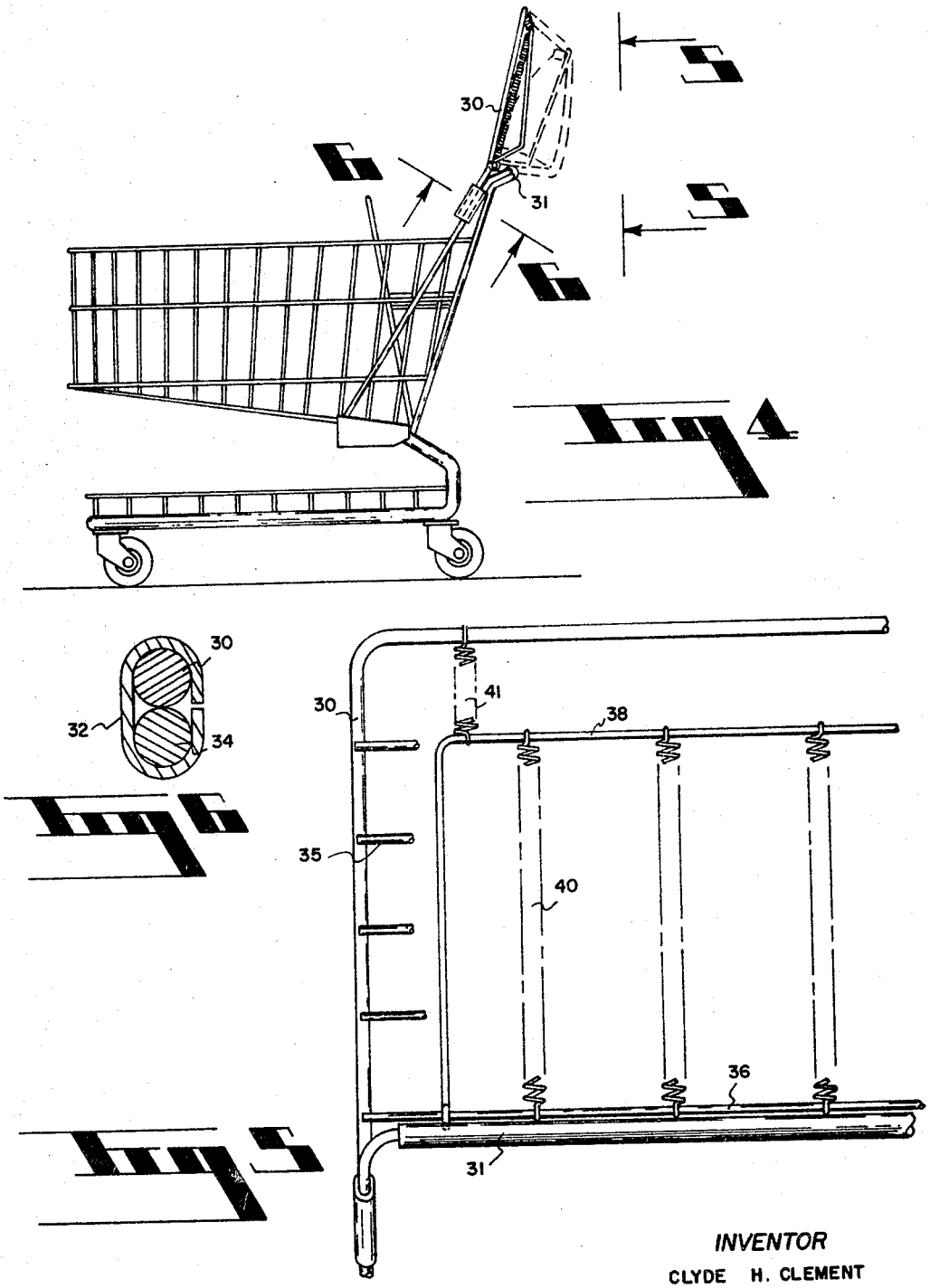
INVENTOR
CLYDE H. CLEMENT
BY
McLaughlin, Cahill & Drummond
ATTORNEYS

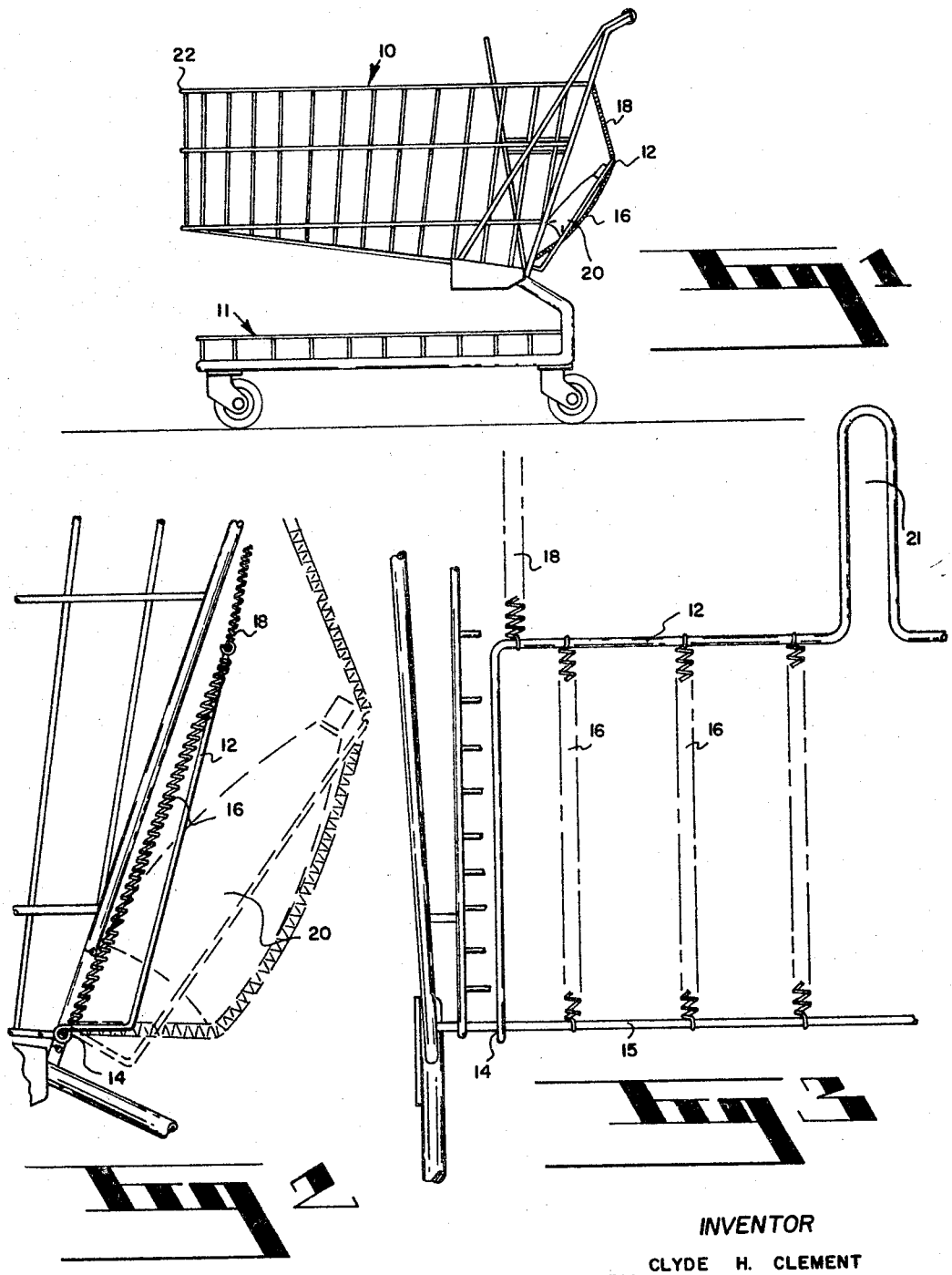

United States Patent Office 3,263,880
Patented August 2, 1966

3,263,880
PURSE RETAINER
Clyde H. Clement, Phoenix, Ariz., assignor of fifty percent to Stanley E. Felix
Filed Mar. 15, 1965, Ser. No. 439,877
7 Claims. (Cl. 224—29)

My invention relates to a purse retainer, and more particularly to a purse retainer associated with a grocery cart of the type commonly provided by supermarkets for their patrons.

A substantial portion of family grocery shopping is done in supermarkets or other self-service types of stores. Most of these stores provide wire-frame carts for the convenience of their customers in shopping. Because of lack of other provision, housewives ordinarily place their purses in the top basket portion of the grocery cart while shopping. Even when the shopper is pushing the cart, her attention is ordinarily directed to one side or the other as she examines shelves in search of the goods she wishes to purchase. With her attention thus diverted, the housewife becomes prey to a low form of criminal known as a "purse snatcher." Some housewives have resorted to placing their purses in the bottom portion of the cart usually reserved for sacks of potatoes, large packages, or the like. This is of little help, since the "purse snatcher" need only stoop slightly in order to seize the purse and escape.

Another problem exists when small children accompany their mother to the store for shopping. Many grocery carts are provided with small seats near the back of the cart in which infants are encouraged to sit. A purse placed in the upper basket is prone to investigation by curious little fingers, often with disastrous results such as a scattering of money, receipts, credit cards, or the like.

As a solution to these problems, many housewives carry large bags which may be looped over the arm and carried while shopping. This is an inconvenient method since purses of this type generally tend to be heavy and cumbersome and intefere with the shopper's manual freedom in selecting items from store shelves.

Accordingly, it is an object of my invention to provide a purse retainer in which a shopper may deposit her purse, thus leaving both hands free for shopping.

It is another object of my invention to provide a purse retainer in which a purse is substantially secure from unauthorized handling.

Other objects and advantages of my invention will become apparent to those skilled in the art in the course of the following specification and claims when taken in light of the accompanying drawings.

Briefly, my invention comprises a frame member rotatably attached at its bottom to a grocery cart and having a plurality of yieldable retainer members forming a grid within the periphery of the frame member. The upper portion of the frame member is joined to the grocery cart by means of at least one tension member. To insert a purse, one merely grasps the top of the frame member and pulls it away from the cart to provide an opening for the purse. When the purse has been inserted between the retainer members and the cart, the top portion of the frame member is released and the tension member forces the frame member and its retainer members toward the cart, thereby frictionally retaining the purse positioned therein.

A better understanding of my invention may be obtained in light of the accompanying drawings in which:

FIGURE 1 is an elevation illustrating the purse retainer and grocery cart combination in accordance with my invention;

FIGURE 2 is a partial elevation illustrating the purse retainer in more detail;

FIGURE 3 is a partial elevation of a cart and purse retainer combination in accordance with my invention with portions of the cart removed for clarity;

FIGURE 4 is an elevation illustrating another embodiment of my purse retainer as adapted for use in combination with a grocery cart;

FIGURE 5 is a partial elevation taken along 5—5 of FIGURE 4; and

FIGURE 6 is a section taken along 6—6 of FIGURE 4.

With reference to FIGURES 1–3, a grocery cart having an upper basket portion 10 and a lower portion 11 is illustrated. The upper basket portion 10 is formed of heavy wire in a grid-like arrangement. A frame member 12 is rotatably secured at its bottom end 14 to the rearmost portion of the upper basket. In the embodiment shown, the bottom end of the frame member is bent to form a loop which engages a cross member 15 of the rear portion of the upper basket member 10. Yieldable retainer members 16 in the form of coil springs form a vertically arrayed grid between the top portion of the frame member 12 and the cross member 15 to which the frame member is rotatably attached. It is to be understood, of course, that other yieldable retainer means can be substituted for the springs illustrated in the drawings. For instance, heavy-duty rubber bands or the like could be employed as retainer means. A tension member 18, illustrated in the form of a coil spring, joins the top or cross-over portion of the frame member 12 to the grocery cart. Usually, I employ a tension member 18 disposed at each side of the frame member, but a single tension member is operable. Rubber-band means or the like may be substituted for the coil spring 18 if desired.

In use, a purse 20 is inserted between the retainer members and the grocery cart. Tension member 18 forces the frame member toward the back of the grocery cart, thereby applying a yieldable pressure on the purse through the retainer members 16. Access to the purse may be had by depressing the frame member 12 and removing the purse in an upward direction.

As is clear from the drawings, a shopper standing near the handle portion of the cart effectively guards the purse from unauthorized handling, thereby leaving the shopper's hands and eyes free for the principal task of shopping.

Many grocery carts provided by supermarkets have a back portion which is hinged at the upper end thereof in order to nest the carts together in storage. My invention does not interfere with this nesting action since the frame member may be attached to the bottom edge of the hinged back portion of the cart and move therewith. Since there ordinarily would be no purse in my purse retainer when the carts are nested, my purse retainer would lie substantially flat against and parallel to the hinged rear portion of the grocery cart basket. To facilitate the nesting action, a bearing means 21 is formed of a loop in the top cross member portion of the frame member 12. Bearing means 21 bears on the forward edge 22 of a second cart brought into nesting relation with the first cart. Bearing means 21 also serves as a handle by which the frame member may be depressed for insertion of a purse.

With particular reference to FIGURES 4–6, another embodiment of my invention is shown. A rack member 30 extends substantially above the handle 31 of the grocery cart. Mounting may be accomplished by any desirable means. For purposes of illustration, I have shown a metal clamping band 32 which encircles and secures together the rack member 30 and a brace member 34 which is part of the grocery cart, thereby to effectively make the rack member a part of the cart. The rack member 30 has a plurality of cross members 35 which may extend horizontally, vertically, or both, to form a substantially rigid grid. A bottom cross member 36 provides support for a frame member 38 and retainer members 40. The frame member 38 is in the shape of an inverted U and its ends are bent to engage the cross member 36 in a rotatable fashion. Yieldable retainer members 40, shown in the form of coil springs, are hooked over the upper portion of the frame member 38 and also engage the crossbar member 36 attached to the rack member 30. Thus, the frame member 38 in combination with the yieldable retainer members 40 and the crossbar 36 forms a movable, yieldable grid. A tension member 41 also shown in the form of a coiled spring joins the top of the frame member 38 to the upper crossbar portion of the rack member 30.

Use of this embodiment is similar to the embodiment previously described. The frame member is pulled away from the rack member and a purse inserted therebetween. The tension member 41, which may be of any resilient material, draws the frame member toward the rack member and applies yieldable pressure on the purse by means of the retainer members 40 which also may be of any resilient material.

Various modifications may be made in my invention without departing from the spirit or scope thereof, and it is to be understood that I limit myself only as defined by the appended claims.

I claim:

1. A purse retainer comprising, in combination with a grocery cart, a frame member, a plurality of yieldable retainer members, and a least one tension member, the bottom portion of said frame member rotatably joined to said grocery cart, said retainer members defining a purse-retaining grid within the periphery of said frame member, and said tension member joining the top portion of said frame member to said grocery cart, whereby a purse positioned between said retainer member and said cart is securely held.

2. A purse retainer comprising, in combination with a grocery cart, a frame member, a plurality of yieldable retainer members, and a pair of tension members, the bottom portion of said frame member rotatably joined to said grocery cart, said retainer members defining a purse-retaining grid within the periphery of said frame member, and said tension members joining the top portion of said frame member to said grocery cart, whereby a purse positioned between said retainer members and said cart is securely held.

3. A purse retainer comprising, in combination with a grocery cart, a frame member, a plurality of yieldable retainer members, and at least one tension member, the bottom portion of said frame member rotatably joined to the rear upper basket portion of said grocery cart, said retainer members defining a purse-retaining grid within the periphery of said frame member, and said tension member joining the top portion of said frame member to the rear of said grocery cart, whereby a purse positioned between the said retainer members and said cart is securedly held.

4. A purse retainer comprising, in combination with a grocery cart, a frame member, a plurality of yieldable retainer members, and at least one tension member, the bottom portion of said frame member rotatably joined to the rear upper basket portion of said grocery cart, said retainer members comprising coil springs and defining a purse-retaining grid within the periphery of said frame member, and said tension member comprising a coil spring joining the top portion of said frame member to the rear of said grocery cart, whereby a purse positioned between the said coil spring retainer members and said cart is securely held.

5. A purse retainer comprising, in combination with a grocery cart, a frame member, a rack member having cross members forming a substantially rigid grid, a plurality of yieldable retainer members, and at least one tension member, said rack member forming a part of said grocery cart and extending upwardly from the rear portion thereof, the bottom portion of said frame member rotatably joined to a cross member of said rack member, said retainer members defining a purse-retaining grid within the periphery of said frame member, and said tension member joining the top portion of said frame member to said rack member, whereby a purse positioned between the said retainer members and said rack member is securely held.

6. A purse retainer comprising, in combination with a grocery cart, a frame member, a rack member having a plurality of cross members forming a substantially rigid grid and extending upwardly from the rear portion of said grocery cart and forming a part thereof, a plurality of yieldable retainer members comprising coil springs, and at least one tension member comprising a coiled spring, a bottom portion of said frame member rotatably joined to a cross member on said rack member, said retainer members defining a purse-retaining grid within the periphery of said frame member, and said tension member joining the top portion of said frame member to said rack member, whereby a purse positioned between said retainer members and said rack member is securely held.

7. A purse retainer comprising, in combination with a grocery cart, a frame member, a plurality of yieldable retainer members, and at least one tension member, the bottom portion of said frame member rotatably joined to the rear upper basket portion of said grocery cart, said frame member defining a bearing means in the top cross member portion thereof, said retainer members comprising coil springs and defining a purse-retaining grid within the periphery of said frame member, and said tension member comprising a coil spring joining the top portion of said frame member to the rear of said grocery cart, whereby a purse positioned between the said coil spring retainer members and said cart is securely held.

References Cited by the Examiner

FOREIGN PATENTS

| | | |
|---|---|---|
| 472,069 | 3/1951 | Canada. |
| 31,249 | 2/1961 | Finland. |
| 932,771 | 9/1955 | Germany. |

HUGO O. SCHULZ, *Primary Examiner.*

F. WERNER, *Assistant Examiner.*